US008471171B2

(12) United States Patent
Price et al.

(10) Patent No.: US 8,471,171 B2
(45) Date of Patent: Jun. 25, 2013

(54) COLD AIR ATMOSPHERIC PRESSURE MICRO PLASMA JET APPLICATION METHOD AND DEVICE

(76) Inventors: Robert O. Price, Norfolk, VA (US); Robert Chiavarini, Virginia Beach, VA (US); Juergen F. Kolb, Norfolk, VA (US); Karl H. Schoenbach, Norfolk, VA (US)

( * ) Notice: Subject to any disclaimer, the term of this patent is extended or adjusted under 35 U.S.C. 154(b) by 1199 days.

(21) Appl. No.: 12/228,240

(22) Filed: Aug. 11, 2008

(65) Prior Publication Data

US 2009/0121638 A1 May 14, 2009

Related U.S. Application Data

(63) Continuation-in-part of application No. 11/141,723, filed on May 31, 2005, now Pat. No. 7,572, 998.

(60) Provisional application No. 60/575,146, filed on May 28, 2004, provisional application No. 60/964,339, filed on Aug. 10, 2007, provisional application No. 60/995,661, filed on Sep. 27, 2007.

(51) Int. Cl.
*B23K 10/00* (2006.01)

(52) U.S. Cl. ........... 219/121.5; 219/121.52; 219/121.48; 219/121.59; 315/111.21

(58) Field of Classification Search ............. 219/121.36, 219/121.59, 121.48, 121.5, 121.51, 121.52, 219/121.39, 121.37, 121.54; 216/67; 315/111.21
See application file for complete search history.

(56) References Cited

U.S. PATENT DOCUMENTS

| | | | |
|---|---|---|---|
| 3,772,188 | A | 11/1973 | Edwards |
| 4,053,814 | A | 10/1977 | Regan et al. |
| 4,088,926 | A | 5/1978 | Fletcher et al. |
| 4,348,357 | A | 9/1982 | Bithell |
| 4,551,609 | A | 11/1985 | Falk |
| 4,801,427 | A | 1/1989 | Jacob |

(Continued)

FOREIGN PATENT DOCUMENTS

| | | |
|---|---|---|
| JP | 2004-026715 | 1/2004 |
| WO | WO 03007916 | 1/2003 |
| WO | WO 2006096710 | 9/2006 |

OTHER PUBLICATIONS

Koinuma et al; "Development and Application of a Microbeam Plasma Generator"; Appl, Phys, Lett. 60(7); Feb. 17, 1992; 2 pages.

(Continued)

*Primary Examiner* — Mark Paschall
(74) *Attorney, Agent, or Firm* — Williams Mullen

(57) ABSTRACT

A microhollow cathode discharge assembly capable of generating a low temperature, atmospheric pressure plasma micro jet is disclosed. The microhollow assembly has at two electrodes: an anode and a cathode separated by a dielectric. A microhollow gas passage is disposed through the three layers, preferably in a taper such that the area at the anode is larger than the area at the cathode. When a potential is placed across the electrodes and a gas is directed through the gas passage into the anode and out the cathode, along the tapered direction, then a low temperature micro plasma jet can be created at atmospheric pressure. Selection of gas microhollow geometry and operational characteristics enable the application of the assembly to low temperature treatments, including the treatment of living tissue.

9 Claims, 13 Drawing Sheets
(1 of 13 Drawing Sheet(s) Filed in Color)

U.S. PATENT DOCUMENTS

| | | | |
|---|---|---|---|
| 4,957,606 | A | 9/1990 | Juvan |
| 5,003,225 | A | 3/1991 | Dandl |
| 5,026,484 | A | 6/1991 | Juvan |
| 5,147,493 | A | 9/1992 | Nishimura |
| 5,198,724 | A | 3/1993 | Koinuma et al. |
| 5,272,414 | A | 12/1993 | Iwanaga |
| 5,272,417 | A | 12/1993 | Ohmi |
| 5,285,046 | A | 2/1994 | Hansz |
| 5,289,085 | A | 2/1994 | Godyak et al. |
| 5,309,063 | A | 5/1994 | Singh |
| 5,369,336 | A | 11/1994 | Koinuma |
| 5,387,842 | A | 2/1995 | Roth et al. |
| 5,403,453 | A | 4/1995 | Roth et al. |
| 5,414,324 | A | 5/1995 | Roth et al. |
| 5,456,972 | A | 10/1995 | Roth et al. |
| 5,569,810 | A | 10/1996 | Tsuji |
| 5,662,266 | A * | 9/1997 | Zurecki et al. .................... 239/8 |
| 5,680,014 | A | 10/1997 | Miyamoto et al. |
| 5,707,594 | A | 1/1998 | Austin |
| 5,876,663 | A | 3/1999 | Laroussi |
| 5,883,470 | A | 3/1999 | Hatakeyama et al. |
| 6,005,349 | A | 12/1999 | Kunhardt et al. |
| 6,072,273 | A | 6/2000 | Schoenbach et al. |
| 6,087,774 | A | 7/2000 | Nakayama et al. |
| 6,177,763 | B1 | 1/2001 | Morrow |
| 6,194,833 | B1 | 2/2001 | DeTemple et al. |
| 6,204,605 | B1 | 3/2001 | Laroussi et al. |
| 6,262,523 | B1 | 7/2001 | Selwyn et al. |
| 6,433,480 | B1 | 8/2002 | Stark et al. |
| 6,858,988 | B1 | 2/2005 | Laroussi |
| 7,719,200 | B2 * | 5/2010 | Laroussi .................. 315/111.81 |
| 2005/0195393 | A1 * | 9/2005 | Karanassios .................. 356/316 |
| 2006/0082319 | A1 | 4/2006 | Eden et al. |
| 2007/0017636 | A1 | 1/2007 | Golo et al. |
| 2007/0075039 | A1 * | 4/2007 | Yashiro et al. .................. 216/67 |
| 2007/0108910 | A1 | 5/2007 | Eden et al. |
| 2008/0174241 | A1 | 7/2008 | Cooper et al. |
| 2010/0327155 | A1 * | 12/2010 | Lopez-Avila et al. ........ 250/282 |

OTHER PUBLICATIONS

Stoffels et al; "Plasma Needle: A Non-Destructive Atmospheric Plasma Source for Fine Surface Treatment of (bio)Materials"; Plasma Sources Science Technology 11 (2002); pp. 383-388.

Stonies et al; "A New Small Microwave Plasma Torch"; Plasma sources Science Technology 13 (2004); pp. 604-611.

* cited by examiner (A)

(B)

COLD AIR ATMOSPHERIC PRESSURE MICRO PLASMA JET APPLICATION METHOD AND DEVICE

The present application is a continuation-in-part of U.S. application Ser. No. 11/141,723 filed May 31, 2005 now U.S. Pat. No. 7,572,998, which claimed priority to U.S. Provisional Application Ser. No. 60/575,146, filed May 28, 2004, both of which are hereby incorporated by reference. This application also claims the benefit of priority to U.S. Provisional Application Ser. No. 60/964,339, filed Aug. 10, 2007, and U.S. Provisional Application Ser. No. 60/995,661, filed Sep. 27, 2007, both of which are hereby incorporated by reference.

STATEMENT REGARDING GOVERNMENT SUPPORT

This invention was made in part with government support under Grant No. AFOSR F49620-00-1-0079 awarded May 1, 2000 by the Air Force Office of Scientific Research. The government has certain rights in this invention.

BACKGROUND

1. Field of the Invention

The present invention relates generally to the field of plasma devices and their uses. More particularly, this invention relates to the creation and use of a microhollow cathode plasma jet discharge.

2. Description of the Related Art

Plasma is an electrically neutral, ionized state of gas, which is composed of ions, free electrons, and neutral species. As opposed to normal gases, with plasma some or all of the electrons in the outer atomic orbits have been separated from the atom, producing ions and electrons that are no longer be bound to one other. Typically, ultraviolet radiation or electrical fields can be used to create plasma by accelerating (or heating) the electrons and ionizing the gas. With separated electrons, plasmas will interact or couple readily with electric and magnetic fields. Practical applications of plasmas may include plasma processing, plasma displays, surface treatments, lighting, deposition, ion doping, etc.

When the ions and electrons of a plasma are the same temperature, then the plasma is considered to be in thermal equilibrium (or a "thermal plasma.") That is, the ions and free electrons are at a similar temperature or kinetic energy. For example, a typical thermal plasma torch used for atmospheric pressure plasma spraying may easily provide a plasma flow with temperatures between 9,000 and 13,000 K.

Non-thermal plasmas are plasmas where the electrons may be in a high state of kinetic energy or temperature, while the remaining gaseous species are at a low kinetic energy or temperature. The typical pressure for generating a non-thermal or low temperature plasma glow discharge is approximately 100 Pa. Devices that attempt to generate discharges at higher or atmospheric pressures face problems with heating and arcing within the gas and/or the electrode, sometimes leading to problems with electrode wear. To counteract these effects, the linear dimension of the device may be reduced to reduce residence time of the gas in the electric field or a dielectric barrier may be inserted to separate electrodes. However, these adjustments can affect scalability and power consumption. Other cases may employ gasses intended to inhibit arcing or ionization. The field has produced few low power, atmospheric, non-thermal plasma jet capable of operating at room or near room temperature.

Some researchers have investigated the generation of non-thermal plasma discharges at atmospheric pressures. For example, a micro beam plasma generator has been described by Koinuma et al. Hideomi Koinuma et al. "Development and Application of a Microbeam Plasma Generator," Appl. Phys. Lett. 60(7), (Feb. 17, 1992). This generator produced a micro beam plasma discharge using radio frequency (RF) and ionization of a gas that flowed between two closely spaced concentric electrodes separated by a quartz tube as a dielectric. The plasma discharge temperature was 200-400 C.

Stoffels et al. has disclosed a non-thermal plasma source titled a "plasma needle." E. Stoffels et al., "Plasma Needle: a non-destructive atmospheric plasma source for fine surface treatment of (bio)materials," Plasma Sources Sci. Technol. 11 (2002) 383-388. The plasma needle also used an RF discharge from a metal needle; an RF electrode is mounted axially within a gas filled, grounded cylinder to generate plasma at atmospheric pressure. Plasma appeared at the tip of the needle and its corona discharge was collected by a lens and optical fiber.

Stonies et al. recently disclosed a small microwave plasma torch based on a coaxial plasma source for atmospheric pressures. Robert Stonies et al., "A new small microwave plasma torch," Plasma Sources Sci. Technol. 13 (2004) 604-611. This torch generated a microwave induced plasma jet induced by microwaves at 2.45 GHz. Some of the features of this torch were relatively low power consumption (e.g., 20-200 W) compared to other plasma sources and its small size. However, the excitation temperature for this small plasma generator was about 4700K.

In general, micro beam generators are often limited in size by a requirement that the concentric or coaxial dielectric be limited in thickness for proper plasma generation. High pressure or atmospheric glow discharges in parallel plane electrode geometries may be prone to instabilities, particularly glow to arc transitions, and have generally been believed to be maintainable only for periods in the order of ten nanoseconds. Further, the above high pressure devices require RF or microwave signals, which can complicate practical implementation.

U.S. Pat. No. 6,262,523 to Selwyn et al. disclosed an atmospheric plasma jet with an effluent temperature no greater than 250 C. This approach used planar electrodes configured such that a central flat electrode (or linear collection of rods) was sandwiched between two flat outer electrodes; gas was flowed along the plane between the electrodes while dielectric material held the electrodes in place. An RF source supplied the central electrode, which consumed 250 to 1500 W at 13.56 MHz, for an output temperature of near 100 C and a flow rate of about 25-52 slpm. One function of the high flow rate is to cool the center electrode in an attempt to avoid localized emissions. This device requires Helium to limit arcing; Helium has a low Townsend coefficient so that electric discharges in Helium carry high impedance. The embodiment that employs a linear collection of rods seeks to limit arcing by creating secondary ionization within the slots between the rods, forming a form of hollow cathode effect. Although an improvement, this device requires a high flow rate of helium, along with a significant RF power input to achieve an atmospheric plasma jet near 100 C.

In recent years, several devices have been presented that have been able to generate a relatively cold plasma plume at atmospheric pressure in air. Different designs have been investigated for their ability to treat heat sensitive surfaces and for prospective use in medical applications. However, these are still generally running at temperatures that are too high to be considered for use on human tissue or any material with low melting point.

In addition, most of such plasma sources are either operated with RF high voltages of several kilohertz up to several megahertz, or pulsed high voltages applied with repetition rates in the kilohertz range. Only in the configuration of Dudek et al. (Dudek et al., J. Phys. D: Appl. Phys. 40, 7367 (2007)) is a direct current applied to generate the plasma. Moreover, the operation with a noble gas is often required to ensure the stability of the plasma at high pressure. In all these conventional units, air is only incorporated from the jet's periphery or exhaust, accounting for an air admixture that is merely a few percent. In addition, conventional direct current devices operating in atmospheric pressure air are prone to filamentation, and will eventually arc.

Biological efficacy of the plasma flow is usually attributed to reactive species such as hydroxyl groups and atomic oxygen, and the use of atmospheric air rather than noble gas greatly enhances their generation. In addition, the operation with ambient air considerably reduces the complexity of the system.

The '723 application disclosed a plasma jet having the advantage of the generation of a stable glow discharge plasma in air at atmospheric pressure by application of a direct current. A steady gas flow through the discharge geometry cools down the plasma which is expelled with the flow. As a result, the heavy particle temperature is reduced to a value that is around room temperature and generated reactive species are brought into the target material where they can interact with contaminants and pathogens. A device capable of generating a cold plasma plume suitable for use on living tissues would be desirable.

SUMMARY OF THE INVENTION

The present invention is a novel device and method to generate a micro plasma jet at atmospheric pressure using microhollow cathode discharges (MHCDs). This device is capable of generating non-thermal plasma near 30 C. When operated with rare gases or rare gas-halide mixtures, the MHCDs can emit a highly efficient excimer radiation. With a plurality of such jets at atmospheric pressure, the present invention may be used as for generating stable and large volume, plasmas. Further, such MHCDs are controllable for temperature and other performance parameters, as described further herein.

MHCDs are high-pressure gas discharges in which the hollow cathode is formed by a microhollow structure, as described in U.S. Pat. No. 6,433,480 to Stark et al., which is hereby incorporated by reference. Hollow cathode discharges are very stable, in part due to a "virtual anode" that is created across the hollow. This virtual anode inhibits local increases in electron density by a corresponding reduction in voltage, reducing the likelihood of arcing. Further, the present invention may be operated with a direct current (DC) voltage on the order of hundreds of volts (up to approximately 1000V), which renders its operation simpler than devices relying on RF or microwave signals.

The present invention employs a microhollow cathode discharge assembly, preferably having at least three layers: two closely spaced but separated electrodes (e.g., a planar anode and a planar cathode separated by a planar dielectric.) A gas passage that also serves as a microhollow is disposed through the three layers. When a potential is placed across the electrodes and a gas flow is applied to the anode inlet to the gas passage then a low temperature micro plasma jet can be created at relatively high or atmospheric pressure. A wide variety of gases may be used, with the data herein generated by use of air, oxygen, and nitrogen. Preferably, the configuration of the microhollow gas passage will be tailored to the application. A variety of microhollow structures may be employed, so long as they support an acceptable hollow cathode discharge while accommodating the flow of gas. At atmospheric pressure, the discharge geometry should be sufficiently small (e.g., several hundred μm to a few mm) to generate a stable glow discharge. An increase in size may require a reduction in pressure in order to produce a stable discharge.

The present invention may be useful in any plasma application, but is specially useful for heat sensitive applications such as surface treatment, sterilization, decontamination, deodorization, decomposition, detoxification, deposition, etching, ozone generation, etc. In the alternative embodiments described below, parameters are selected so as to produce a device and method capable for the treatment of living tissue or other sensitive surfaces due to the low temperature plasma jet discharged from the device.

An aspect of the present invention is a device for the creation of a high pressure plasma jet for use on living tissues, having a first electrode and a second electrode, spaced from the first electrode. The first electrode and the second electrode may optionally be plane-parallel. The first and second electrodes define at least one microhollow (or channel/canal) through the first electrode and the second electrode that is 0.1-1.2 mm wide. An electrical circuit creates an electrical potential between the first electrode and the second electrode, such that the first electrode is a cathode and the second electrode is an anode, at a voltage and direct current for producing microhollow discharges in each of the at least one microhollow formed through the first electrode and the second electrode. A gas supply is used for supplying gas into each of the at least one microhollow at the second electrode so as to create a gas plasma jet exiting the at least one microhollow at the first electrode, wherein the gas is selected from the group of air, noble gasses, molecular gasses, or mixtures thereof.

Optionally, the gas supply is capable of supplying gas into each of the at least one microhollow at the second electrode supplies gas at a flow rate at about or above the critical Reynolds number. Alternatively, the gas supply supplies gas into each of the at least one microhollow at the second electrode supplies gas at a flow rate at or between about 50 ml per minute to about 12 liters per minute.

In an alternative embodiment, the device has a microhollow that is tapered, such that the area of the microhollow disposed in the second electrode is larger than the area of the microhollow disposed in the first electrode. In another embodiment, the first electrode is separated from the second electrode by a dielectric that defines at least one microhollow formed through the dielectric, in line with and optionally substantially similar in size and shape to the at least one microhollow through the first electrode and the second electrode.

Another aspect of the present invention is a method of generating a high pressure, low temperature plasma gas jet, involving the steps of applying an electrical potential between a first electrode and a second electrode spaced from the first electrode wherein said first and second electrodes have at least one microhollow formed through the first electrode and the second electrode, such that the first electrode is a cathode and the second electrode is an anode, at a voltage and a direct current so as to produce microhollow discharges in each of the at least one microhollow; directing a gas having a flow rate of about 50 ml per minute to 12 liters per minute through each of the at least one microhollow at the second electrode so as to create a gas plasma jet exiting the at least one microhollow at the first electrode; and wherein the at least one microhollow is 0.1-1.2 mm wide.

Alternatively, the first electrode of this method is separated from the second electrode by a dielectric that defines at least one microhollow formed through the dielectric, in line with and, optionally, substantially similar in size and shape to the at least one microhollow through the first electrode and the second electrode. Similarly, the first electrode and second electrodes may be plane-parallel.

Another aspect of the invention is a method of generating a high pressure plasma jet from a glow plasma discharge involving the steps of positioning a first electrode and a second electrode in a plane parallel relationship with a space therebetween; providing a dielectric between the first electrode and the second electrode; forming at least one microhollow in line through the first electrode, the second electrode, and the dielectric; generating an direct current electric field between the first electrode and the second electrode, where the first electrode is a cathode and the second electrode is an anode; and directing a gas having a flow rate of about 50 ml per minute to 12 liters per minute through each of the at least one microhollow at the second electrode so as to create a gas plasma jet exiting the at least one microhollow at the first electrode. Optionally, this method includes a microhollow that is about 0.1-1.2 mm wide. Also optionally, the at least one microhollow formed through the dielectric and the first and second electrodes is substantially similar in size and shape.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will be better understood in relation to the attached drawings illustrating preferred embodiments, wherein:

FIG. 5 is a graph of gas flow rate and gas jet temperature measured end on.

DETAILED DESCRIPTION OF THE PREFERRED EMBODIMENT

The following detailed description is an example of an embodiment in the best presently contemplated modes of carrying out the invention. This description is not to be taken in a limiting sense, but is made merely for the purpose of illustrating general principles of embodiments of the invention.

The present invention is an apparatus for the creation of an atmospheric pressure, low temperature plasma micro jet. In addition, radical species of the present invention may be controlled or tuned for specific applications. By operation with different gases, the device is a simple plasma-reactor producing particular radicals, such as ozone, OH, or other reaction products, depending on the desired gas.

The micro jet of the present invention is based on inducing a glow discharge in an axial and lateral direction while flowing air or other gases through a microhollow gas passage subject to an electric field. The jet may be operated in parallel with similar such jets for scalability to larger volume applications. As described further herein, the discharge gas temperature may be controlled as a function of gas flow rate through the microhollow structure, the applied potential across the electrodes, and the structure of the microhollow assembly. A variety of microhollow structures or geometries may be employed, so long as they support an acceptable hollow cathode discharge while accommodating the flow of gas; the discharge geometry should be sufficiently small (e.g., sub-millimeter) to generate a stable glow discharge. The below detailed description refers to an illustrative embodiments having a circular hole with a diameters of 0.15-0.45 mm at the anode and 0.07-0.3 mm at the cathode, which produced a stable discharge. Other geometries for microhollow gas passages may include shaped hollows, slits, curvilinear voids, etc. Optionally, for improved gas flow characteristics, the gas passage may be tapered (as illustrated herein) such that the diameter at the cathode may be smaller than that at the anode. This can provide a beneficial nozzle effect; however, embodiments having an un-tapered gas passage will also function satisfactorily depending on the application. A wide variety of gases may be used.

Figure 1:
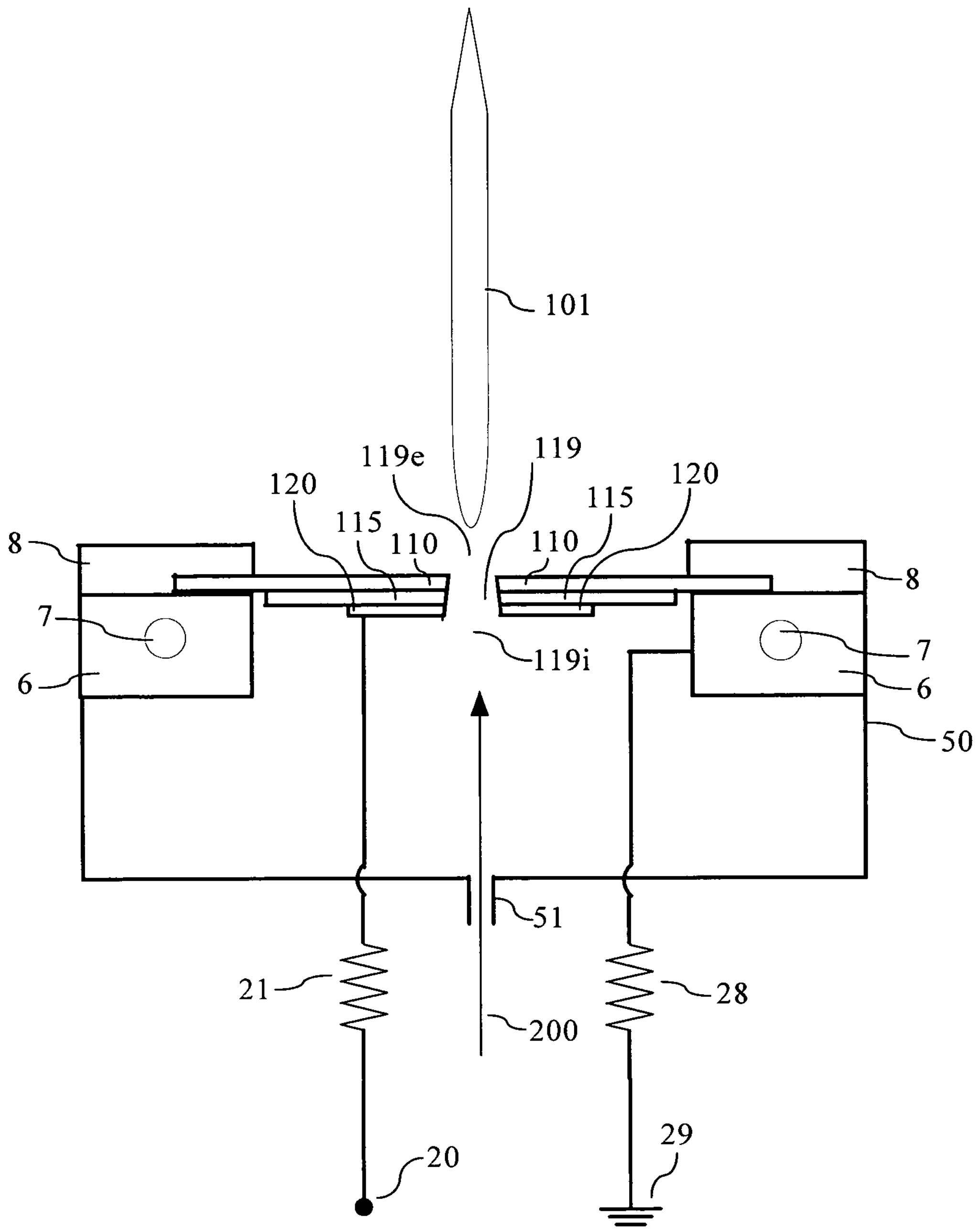
FIG. 1 shows a cross sectional view of the physical structure of an embodiment of the present invention including a supply circuit and gas chamber.
Figure 2:
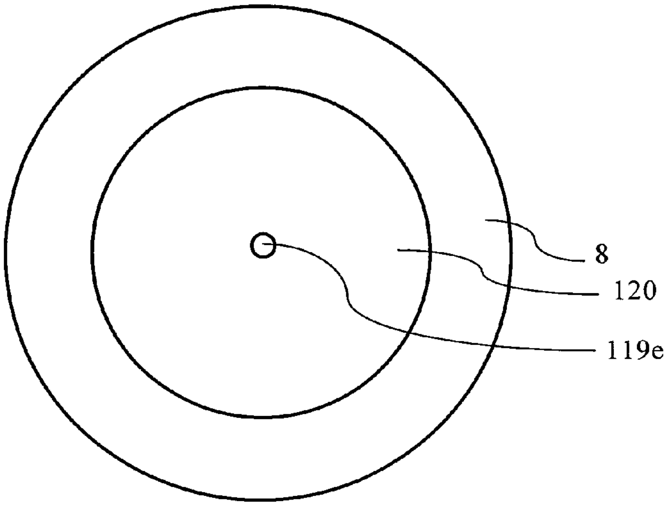
FIG. 2 illustrates a top view of a circular embodiment of the present invention.
Figure 3:
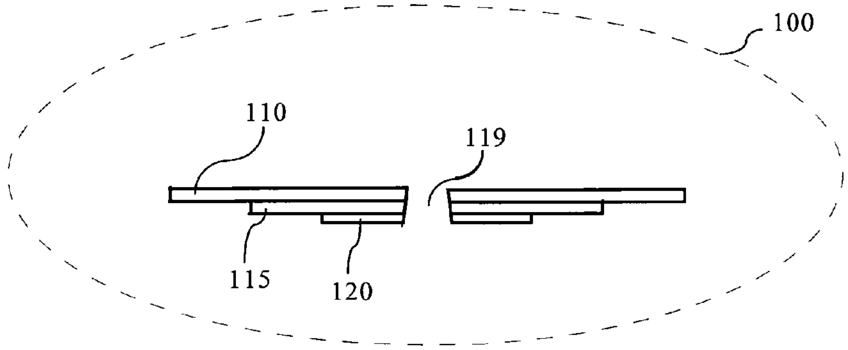
FIG. 3 shows the planar microhollow assembly layers with the microhollow gas passage.

As shown in the cross sectional view of FIG. 1, a plasma j et 101 may be produced using the present invention, preferably using a direct current potential applied to plane-parallel first electrode 110 and plane parallel second electrode 120 separated from each other. FIG. 2 shows a top view of an example of present invention with second electrode 120, retaining ring 8, and microhollow gas passage exhaust 119*e*, in some embodiments also referred to as a borehole. FIG. 3 is an illustration of the components of planar microhollow assembly 100. Electrodes 110 and 120 may be fabricated from 0.25 mm thick sheets of molybdenum, although other materials and thicknesses will work as well depending on the specific application. The electrode material and thickness need be able to sustain temperatures in the range of 1000-1400 C. Sheet dielectric 115, in this example made of 0.25 mm thick alumina, acts as an insulator between first and second electrodes 110 and 120. Microhollow gas passage 119 in this embodiment is a tapered channel that provides communication of gas across through an electric field formed when a potential is placed across first and second electrodes 110 and 120. The flow of gas is typically from a nozzle or chamber 5 (not shown) to the atmosphere, past the three layers of the first electrode 110, dielectric 115, and second electrode 120. In this example, the gas passage ranged from 0.15 to 0.45 mm diameter in second electrode 120 and 0.08 to 0.3 mm in first electrode 110. However, as noted above, the passage need not be tapered and the dimensions are limited only by the requirement to produce a stable gas discharge under the conditions of application. With reference to FIG. 1, retaining ring 8, by threads or other fastening means known in the art, mounts onto conductive bulk 6, to fix or retain microhollow assembly 100 in place. First and second electrodes 110 and 120 are juxtaposed adjacent and parallel to sheet dielectric 11. For this example, electrode 20 is in conductive contact with conductive bulk 6. Chamber 5 may be nonconductive, insulated from conductive bulk 6 by acrylic or other means, or incorporated into an electrical circuit, as is known to those in the art. Optional coolant channel 7 or other heat sink is provided to withdraw excessive heat.

A positive direct current power supply 20 may preferably be conductively connected to second electrode 120 via current limiting resistor 21. First electrode 110 is electrically connected to conductive bulk 6, which in turn connects to ground 29 by way of current view resistor 28. Other means of creating a potential between electrodes 110 and 120 may be used, including alternative circuit configurations or arrangements employing other currents forms. In general, first electrode 110, or the outer electrode, is grounded to form a cathode, with second sheet electrode 120, or the inner electrode being an anode. A desired breakdown voltage will be a function in part of the electrode distance and the pressure of application; the voltage may be varied within a limited range depending on the desired gas flow rate and current.

As demonstrated by arrow 200, a gas may be admitted into or blown through chamber inlet hole 51 of chamber 50. The gas enters microhollow gas passage 119 by microhollow gas passage inlet 119*i*. In some embodiments, chamber 50 may contain gas at a pressure. The present invention may employ a wide variety of gases, depending on the application. As gas is admitted axially at the bottom of chamber 50, whether by pressure or by stream, a well defined micro plasma jet 101 expands into the surrounding ambient environment. In this example, such a plasma micro jet may have a diameter on the order of 1 mm; the jet may be elongated as a function of gas flow rate and microhollow dimensions. Additionally, as gas flow rate increases the flow will eventually cross from laminar to turbulent flow, changing the jet characteristics.

Figure 4:
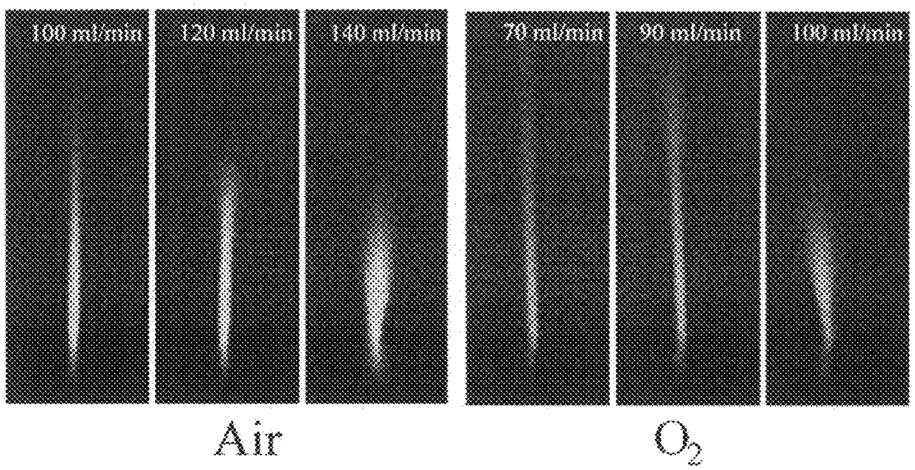
FIG. 4 includes images of the plasma micro jet.
Figure 5:
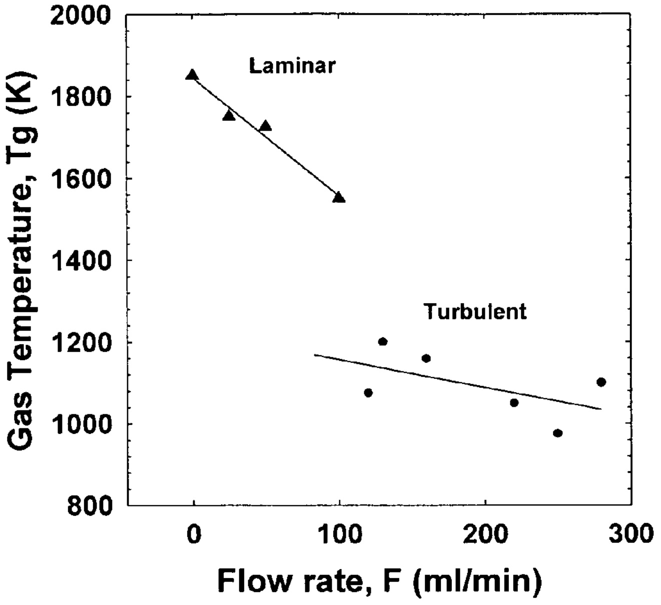

FIG. 4 shows photographs of the visible light emissions of a micro plasma jet created by the present invention using air or oxygen at the flow rates indicated therein. These illustrate the transition from laminar to turbulent flow at 140 ml/min for air and 100 ml/min for $O_2$. As may be seen in FIG. 5, the discharge temperature (taken end-on) decreased with an increase in gas flow rate, and dropped noticeably (e.g., approximately 350 K in this example) with the transition from laminar to turbulent flow.

Figure 6:
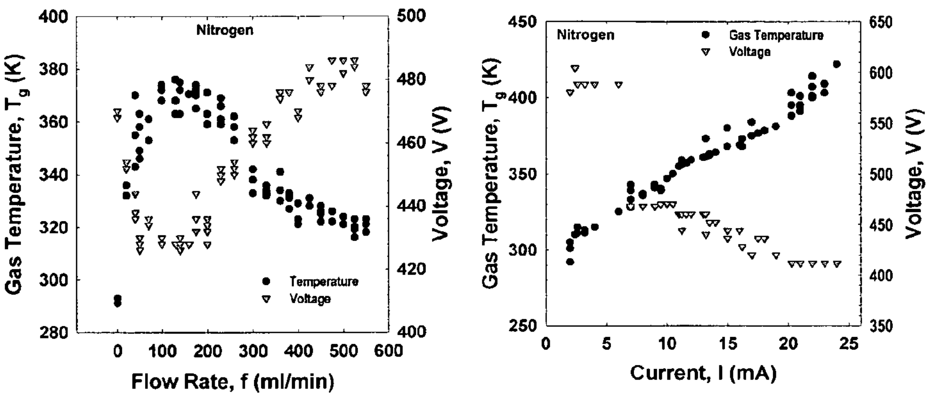
FIG. 6 illustrates the relationship among gas flow rate, temperature, and applied voltage. In these graphs, temperature is measured side-on at 1.65 mm from anode surface.

FIG. 6A is a chart of the temperature and voltage of the discharge jet taken from the side, 1.65 mm from the anode surface, as a function of nitrogen flow rate with 7 mA current applied. Again, these results are provided for this exemplary embodiment and may change with dimensional adjustments. The temperature initially increased as a result of increasing gas flow rate until a peak value at 140 ml/min. As the flow rate increased beyond 140 ml/min, the gas temperature then decreased. The discharge voltage demonstrated an opposite trend related to the transition from laminar to turbulent flow. Initially, as the flow rate was increased, the flow demonstrated steady laminar characteristics. As the flow approached the critical Reynolds number, $R_c$, it became unsteady. An increase in flow rate led to bursts of turbulent flow and the formation of eddies; the mixing caused by eddy currents absorbed energy and decreased the gas and plasma temperature. The increase in discharge voltage also shown in FIG. 6A resulted from an increase in the attachment of electrons to oxygen molecules as gas temperature decreased.

The gas flow rate is also relevant in that it affects the time the gas spends within the electric field. For the present embodiment, the microhollow diameter was approximately 100 μm for electrode 110 and 200 μm for electrode 120. The initial discharge current was 10 mA. The decrease in gas temperature was related in part to the decrease in residence time ($t_r$) for the gas within the microhollow or gas passage 119 while under the applied electric field. The gas flow rate (f) through gas passage 119 relates to the residence time as a function of the volume of the microhollow. For the embodiment in FIG. 5, the microhollow cross sectional area was $17.67\times10^{-3}$ $mm^2$, with a sample thickness of 1 mm, producing a volume constant (c) of approximately 0.0177 $mm^3$. The residence time may be calculated as follows:

$$t_r=c/f$$

Thus, at a flow rate of 20 ml/min the residence time is 53 μsec, while a flow rate of 200 ml/min produces a residence time of 5.3 μsec.

In another example, the gas discharge temperature increased linearly with discharge current for a constant nitrogen flow rate, as shown in FIG. 6B. At 1.65 mm from the surface of electrode 110, the micro plasma jet was at room temperature or 300 K, for 3 mA current and at 475 K for 22 mA; both cases taken at a flow rate of 300 ml/min of nitrogen. As may be expected, the results with air were similar. The voltage—current characteristics are shown for current ranging from 2-24 mA. For a discharge current from 2-6 mA, the discharge voltage was nearly constant at 585 V. Above 6 mA, a Townsend form of transition to a negative glow discharge dropped voltage to 465 V. From 7-20 mA, the discharge voltage decreased from 465 to 420 V, in an apparently normal glow discharge reaction. Above 20 mA, the voltage was constant at 412 V. As shown, an increase of current at a constant flow rate will produced a linear increase in gas temperature.

When gas flows into the inlet of microhollow gas passage 119*i* (i.e., disposed within the anode or second electrode 120), it is strongly activated by the electric field, which causes electron excitation, ionization, and imparts vibrational and rotational energy, as well as disassociation of the gas. As described above, a short residence time within the electric field results in a lower temperature of the plasma output. A flow of gas with a long residence time insider the electric field results in a higher temperature attributable to the efficient exchange of atoms and molecules during the residency. The jet or flow forces the gas perpendicular to electrodes 120 and 110, out the microhollow gas passage 119 and out of the electric field. As the gas flows away from the MHCD, there is relaxation, recombination, and diffusion.

The selectivity of the generated radical may be controlled by the residence time of the gas inside the electric field and the characteristics of the applied field. For example, by choice of gas and superimposing a high voltage pulse of controlled duration and field strength, the present invention may be tuned to produce plasma having desired radical species, for applications such as chemical processing, etc.

In general, two flow mechanisms operate to reduce energy as the discharge diffuses into the surrounding environment. At atmospheric pressure in air, the collisions between electrons and heavier gas particles can cause an electron to lose up to 99.9% of its energy. (C. O. Laux, et al., $30^{th}$ AIAA Plasmadynamic and Laser Congress (1999)). In these collisions, electrons transfer their vibrational energy to nitrogen molecules, which then dissipate the energy in vibrational relaxation by a translation mode. A second mechanism is the mixing by diffusion of plasma after exiting the gas passage, which becomes more pronounced in turbulent flow. A laminar flow exiting the passage will initially enter a transitional phase in which eddies of the surrounding, cold gases are entrained into the plasma jet, but with incomplete or limited mixing. A second phase is a departure from laminar flow as mixing of the eddies increases; ultimately, the eddies of colder gases break down, mixing with the discharge extensively and diffusing the energy of the jet.

Thus, in both laminar and turbulent flow for the present invention, gas temperature is a controllable function of flow rate, structure of the microhollow gas passage, and current or the electric field. The microhollow cathode discharge generates a micro plasma jet at atmospheric pressure having a controllable temperature: an increase in flow rate reduces gas temperature while an increase in current increases gas temperature. This stable micro plasma jet described herein displayed a power consumption that varied between 1-10 W, with temperature measurements between 300 K and 1000 K, as a function of gas flow rate and discharge current.

SUMMARY

In summary, the present invention is a microhollow cathode discharge assembly. In the illustrative embodiment, the assembly in planar form comprised a planar anode sheet; a planar cathode sheet, and a dielectric between the anode and cathode. Disposed through these sheets or layers is a microhollow gas passage; preferably, this gas passage is tapered such that the diameter at the anode is smaller than that at the cathode. When a potential is placed across the electrodes, and gas flows through the gas passage in the direction from the anode to the cathode (i.e., in the illustrated example, in the direction of the taper), a low temperature micro plasma jet can be created at atmospheric pressure.

Plasma at atmospheric pressure may have a wide range of applications, including surface treatment, medical treatment, cleaning, or purification. Selectivity of the plasma for a particular use can be controlled in part by tuning the gas temperature, the potential, and the nature of the operating gas. In addition, the generated radical species can be influenced by the choice of gas, in that some gases generate certain radical species more efficiently or effectively than others. Radical species may also be affected by the residence time of the gas inside the electric field within the microhollow and the applied field. The electric field may be pulsed or varied in duration and field strength for desired characteristics radical species. That is, the energy, radical species, and temperature may be chosen for specific application of plasma—such as plasma interaction with cancer or tumor cells.

Additionally, the jet may be combined with other such jets to form arrays to increase the scale of the applications for generating stable large volume, low temperature, atmospheric pressure air plasmas.

This contemplated arrangement may be achieved in a variety of configurations. An exemplary embodiment of as discussed above may be seen in FIG. 7.

An aspect of the present application is the use of a micro plasma jet for application to living tissues, such as skin, enabled by a particular embodiment of the device. As noted above, when the flow approaches the critical Reynolds number, $R_c$, it becomes unsteady. An increase in flow rate led to bursts of turbulent flow and the formation of eddies; the mixing caused by eddy currents absorbs energy and decreases the gas and plasma temperature, expanding the potential uses.

Additional Embodiments

By use of a gas supply providing a flow rate of about 2-12 l/min, it is possible to achieve a stable glow discharge in an electrode geometry with discharge channel of the microhollow under about 1.2 mm width, preferably about 0.8-1.2 mm wide. The operation may use current on the order of about 30 mA at voltages of about 1-2 kV and breakdown voltages about twice as high. In general, these parameters exceed those of the basic embodiments first described in the '723 application by about one order of magnitude. As a result, several new design criteria have been enabled.

Figure 9:
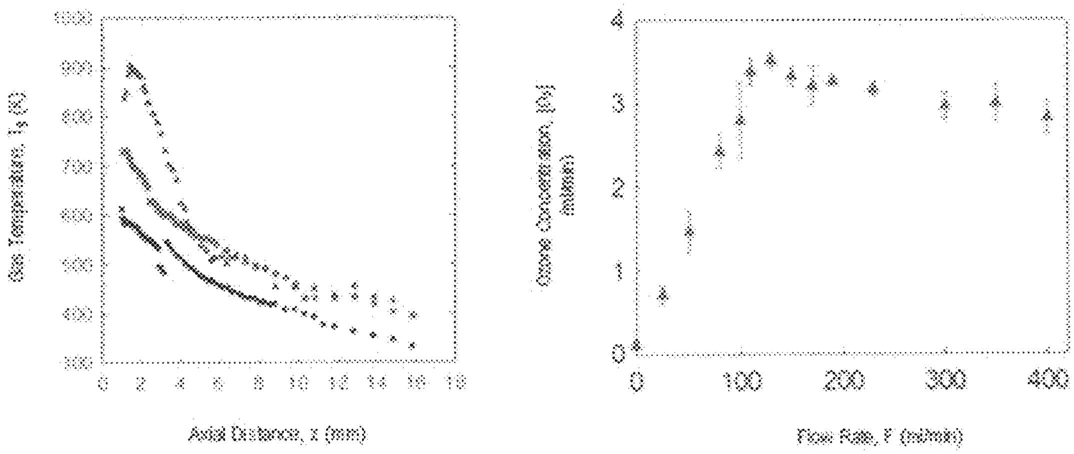
FIG. 9 illustrates operational aspects of gas temperature and ozone concentration.

The left hand graph of FIG. 9 show gas temperature measurement for various gasses with respect to the axial distance in millimeters, with a fixed flow rate of 120 ml/min and fixed current of 18 mA. The right hand graph shows the ozone concentrations by flow rate, using air and a fixed current of 13 mA.

For these parameters of operation, the distance between cathode and anode becomes less critical and may be on the order of a few millimeters. A typical distance is on the order of about 0.5-1.5 mm. The insulating layer between cathode and anode may optionally be omitted, leaving a space. The high flow rate provides further a means of effectively cooling the system without additional heat sinks or other provisions. It enables also the use of less expensive material with lower melting points, such as brass or PVC instead of molybdenum and alumina. The use of ambient air as an operating gas provides for the generation of reactive species such as ozone, hydroxyl, atomic oxygen, nitric oxides, etc., in a simple system at low building and operating costs. Other gasses may be used. For example, the gas may be selected from the group of air, noble gasses (e.g., helium, argon), molecular gasses (nitrogen, oxygen), and mixtures thereof.

Figure 8:
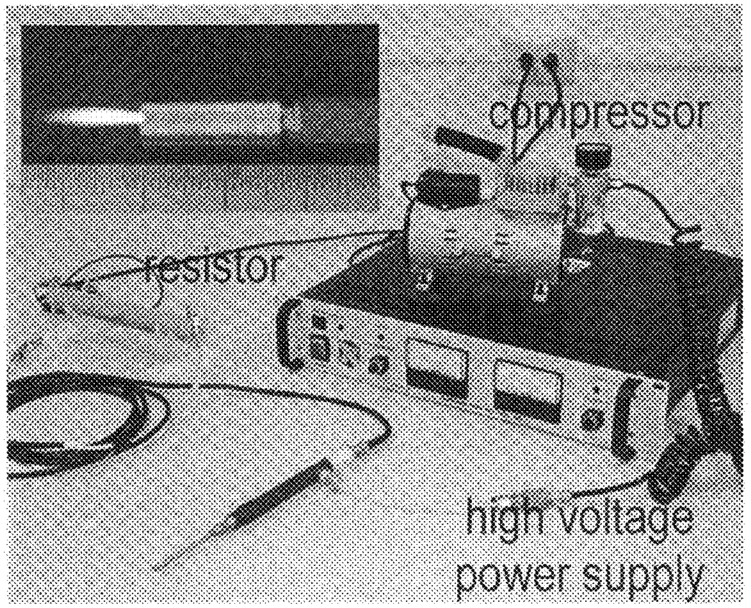
FIG. 8 is an image of a laboratory embodiment of the present invention.

In a preferred embodiment of the micro plasma jet, the device geometry was modified to use the expelled plasma in localized applications on tissues such as skin, gums, dental cavities, and others. To enable a high level of accuracy, the discharge is put on the narrow tube, as shown if FIG. 8. This setup can be used easily as a medical probe. In the described embodiment, the probe diameter was about 5 mm. The size of the probe can be further reduced by techniques known to those skilled in the art. It is further possible to replace the rigid tube with a flexible one.

Figure 12:
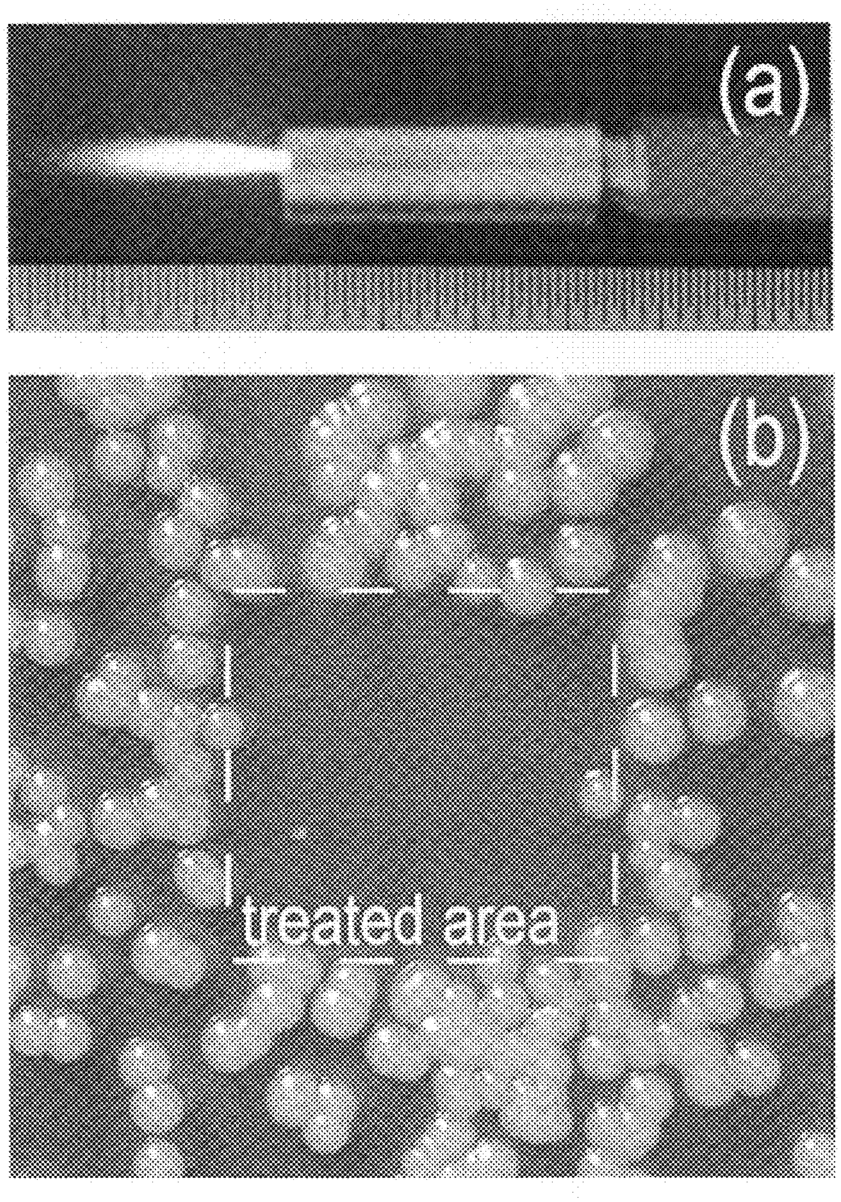
FIG. 12 shows in 12(*a*) an image of an afterglow plasma jet generated with an air flow rate of 8 l/min, with the plume extending about 1.5 cm, and in 12(*b*) yeast inoculated agar plate having been treated by this afterglow plasma jet across a 1×1 $cm^2$ area with an exposure distance of 1 cm for 90s.
Figure 13:
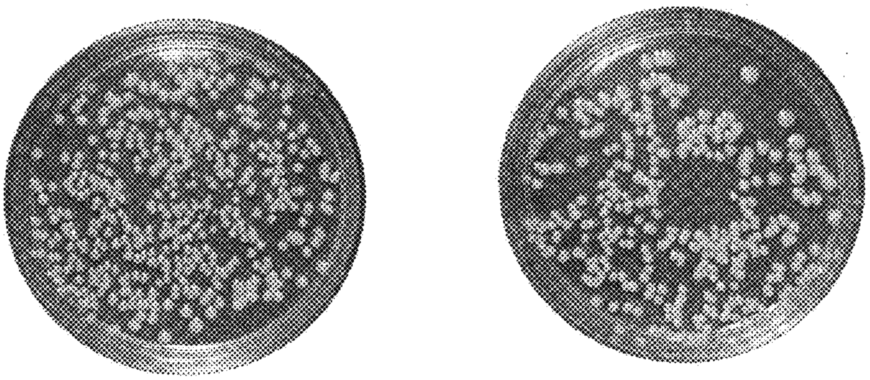
FIG. 13 is an additional image showing treatment.

An application of the presented embodiment is the treatment of pathological skin conditions such as, but not limited to, rashes, warts, and bacterial, viral or fungal infections by the interaction of these pathogens with free radicals, negative ions, excited molecular and atomic states, electromagnetic and in particular ultraviolet emission from plasma or the afterglow respectively. The treatment method offers therefore a drug-free, non-systemic alternative to conventional treatments such as antibiotics. With an increase in gas flow rate, active species are delivered further and in larger number down to the treatment area. Since the temperature of the exhaust stream is close to room temperature, no thermal damage is expected. The efficiency and accuracy of this method is shown by the complete remediation of the yeast fungus *Candida kefyr* in a 1 cm by 1 cm square with a treatment of 90 seconds, as shown in FIGS. 12-13. Thus, a method of the present invention is the provision of such a micro-plasma jet, locating the jet proximate to living tissue of concern, and applying the jet to the desired area of the tissue of concern. Of course, the precise parameters of such application may vary depending on the organism of concern, the tissue, the scope of the application, etc.

Figure 7:
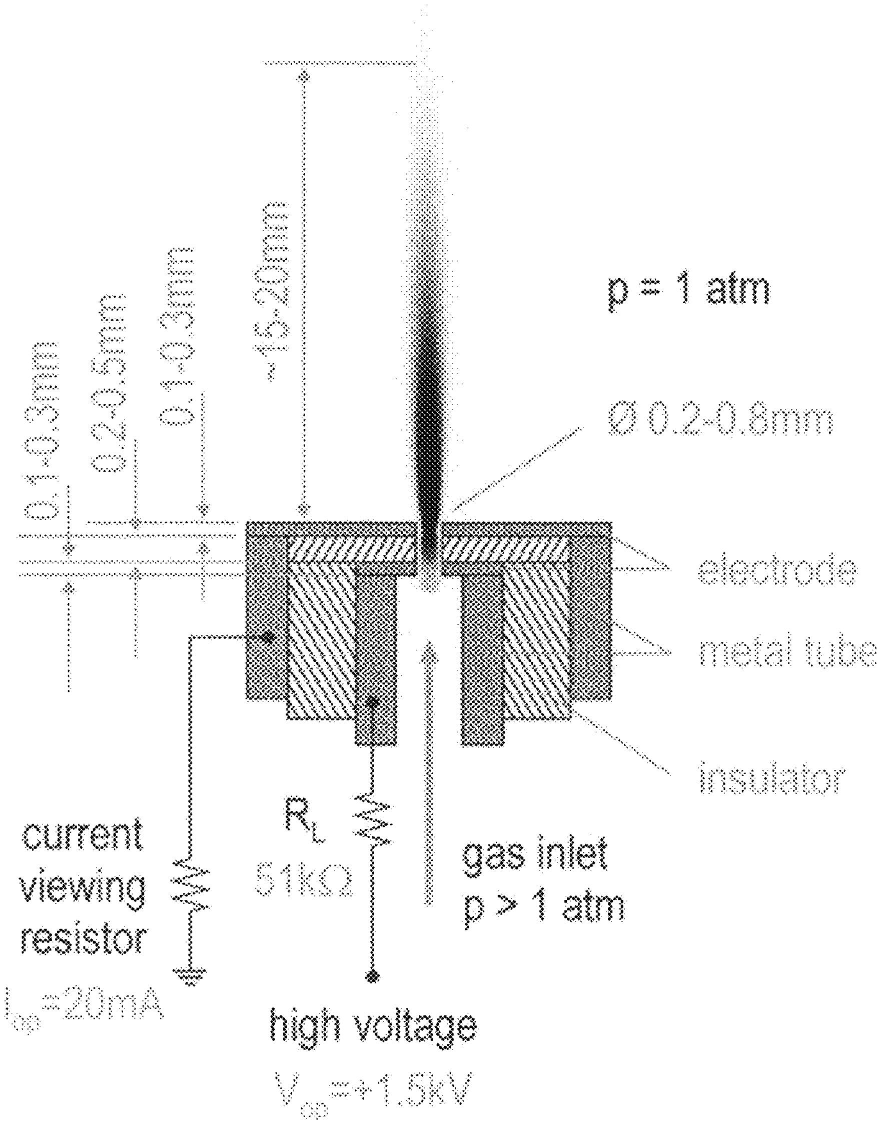
FIG. 7 is an embodiment of the present invention with the electric circuitry shown.

Another aspect of the invention was design of a successful jet in the microhollow cathode geometry of FIG. 7 by operating it at atmospheric pressure with and into ambient air by utilizing the concept of microhollow cathode discharges. This setup may have a discharge channel through an insulator with a thickness of about 0.2-0.5 mm and a 0.2-0.8 mm separates the anode and cathode electrodes. A hole with the same diameter width in the cathode opens the discharge to ambient air. A gas supply supplies air, or any other operating gas, which is ejected from the anode side through the discharge channel or canal of the microhollow. When a dc voltage of 1.5-2.5 kV is applied between anode and cathode (depending on the thickness of the insulator separating the electrodes), breakdown is initiated in the gap between the electrodes. Subsequently, a glow discharge may be sustained at voltages of 400-600 V with the current limited to 20 mA by a ballast resistor of 51 kΩ. (The current may be decreased, for example, by increasing the value of the ballast resistor.) A stable discharge can be sustained for currents as low as 2 mA. Accordingly, a power of less than 10 W is dissipated in the plasma while most of the power supplied by the power supply in the current setup is dissipated in the ballast resistor. For use as a handheld device, a microhollow cathode assembly may be placed on the end of two metal tubes separated from each other by a third insulating tube, as shown in FIG. 7. For practical use and safety it is easiest to ground the outer tube and apply high voltage to the internal electrode, shielded from accidental contact. The inner tube also serves as the conduit for the gas flow to the discharge. For diameters of the discharge canal of the microhollow of less than 1 mm, the discharge is stable and the discharge current can be controlled by adjusting the applied voltage and gas flow. The gas flow also provides an effective cooling mechanism for the discharge plasma. For flow rates on the order of 8 l/min, this cooling effect allows the use of easily machine-able electrode materials such as brass and insulators made from polytetrafluoroethylene or acetal. For these conditions, such an embodiment could operate continuously with a discharge for 3-4 h/day for a week without changes in the electrical discharge parameters.

Figure 10:
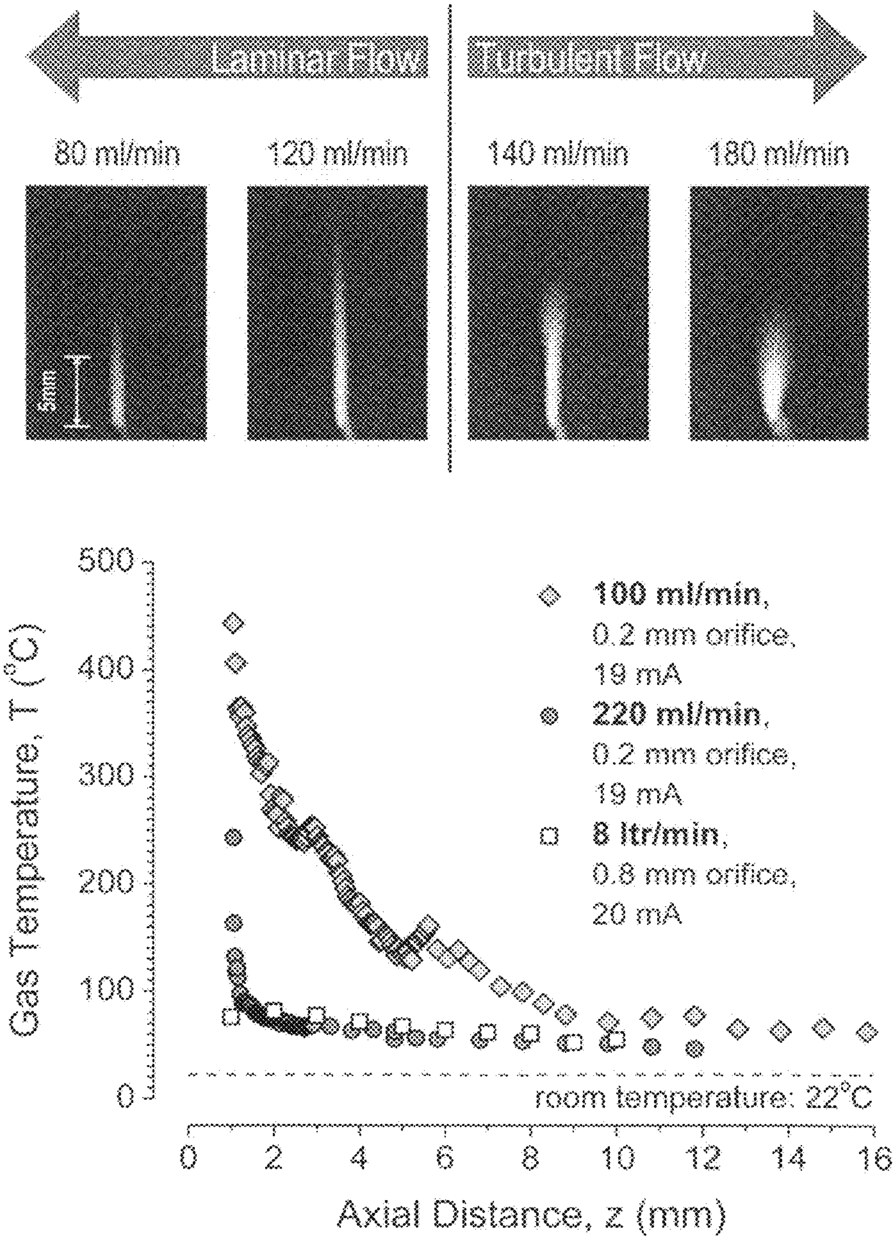
FIG. 10 shows images of an embodiment's expelled afterglow plasma plume in the upper section. For a flow rate of about 140 ml/min the exhaust stream change from laminar to turbulent. The lower section shows corresponding gas temperature along the plasma plume. For turbulent flow rate conditions, temperatures decrease to values close to room temperature within a few millimeters.

The temperature in the ejected plasma and afterglow plume depends on current and on the gas supply/flow characteristics. For small flow rates, a laminar flow can be maintained through the orifice, as shown in FIG. 10, corresponding to rather high temperatures close to the nozzle (FIG. 10, lower section). With increasing flow rates the flow eventually becomes turbulent. In this regime, eddies are mixing the hot exhaust stream with cold ambient air, thereby effectively reducing the heavy particle temperature. The flow for such electrode, gas, and discharge conditions remains laminar up to a critical Reynolds number of 100 and becomes turbulent for a numbers exceeding 300. The estimate preferably takes into account changes of gas viscosity and density with temperature, which are difficult to accurately assess for a change of several hundred degrees in close proximity to the nozzle. In this embodiment of the microhollow cathode geometry (with the flow through an orifice of less than 1 mm), laminar flow conditions for a microhollow discharge channel width of 0.2 mm corresponds to a flow rate of 120 ml/min and for a microhollow width of 0.8 mm, to a ten times higher flow rate. The images presented in FIG. 10 show the transition from laminar to turbulent flow for a microhollow width of 0.2 mm in diameter. The related measurements in FIG. 10 document how the change in flow characteristics affects the change in temperature with distance from the cathode. As seen in the lower section of FIG. 10, for flow rates of 220 ml/min the jet approaches room temperature for distances exceeding 5 mm. Even at distances of 5 mm from the nozzle, gas temperatures do not exceed 55° C. (328 K).

Figure 11:
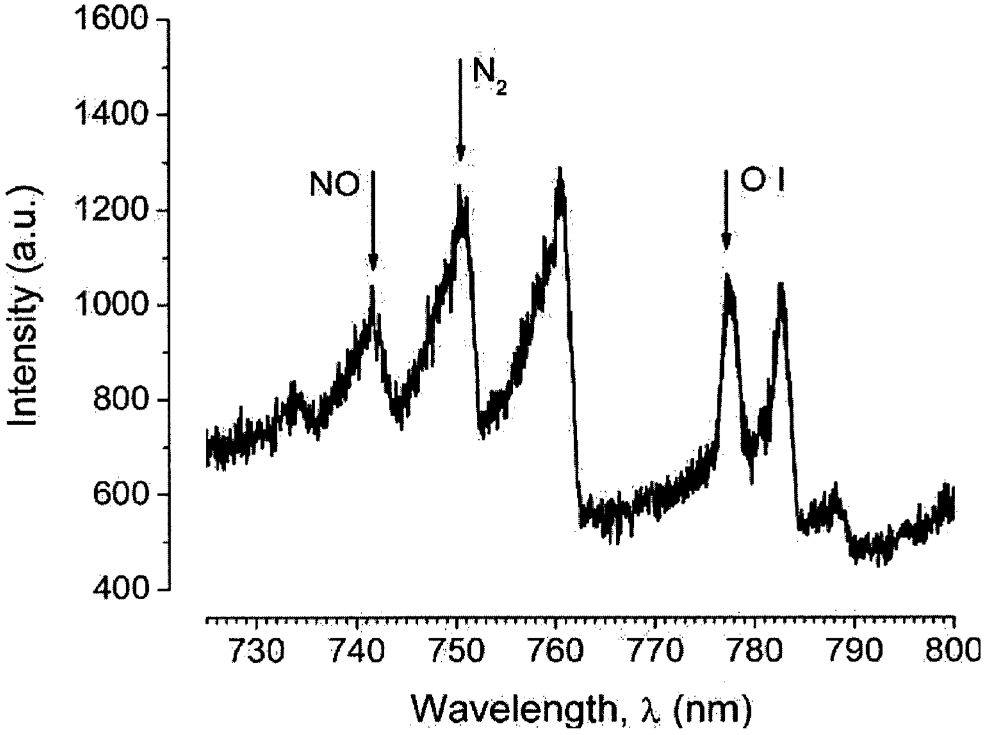
FIG. 11 illustrates the emission spectrum close to infrared wavelengths recorded for an embodiment operating with discharge of ambient air, with lines and bands for reactive species such as atomic oxygen at 772 nm and nitric oxide at 742.0 nm.

The plasma or afterglow jet with a 1-2 cm (visible) length, contains charged particles as well as radicals. Due to recombination and attachment, the electron density rapidly decreases with distance from the nozzle. Negative and positive ions will be found at larger distances from the nozzle due to their lower recombination rate. Excited species and reactive species will survive longest and can interact with materials at a distance of up to a few centimeters, depending on the lifetime of the radicals. To identify reactive species that are generated in the discharge and subsequently expelled with the gas flow, spectra were recorded for emission along the axis of the jet in the range from 200-850 nm with a half-meter spectrometer. A near infrared section of the spectrum is presented in FIG. 11. It shows, in particular, contributions from atomic oxygen (OI$^5$S$^0$-$^5$P, 777.2 nm), as well as emission of some other reactive oxygen compounds. These highly reactive species are considered to be the most effective agents in attacking cells or organic material in general. In addition to these primary discharge products, high concentrations of ozone are measured as a result of various secondary reactions. With a half-life of several hours or even days (depending on temperature and humidity), this radical is well known as a disinfecting agent. By itself, the generation of ozone as a secondary reaction product is indicative of high concentrations of precursor species, such as O, $OH^-$, and $NO^-$. Excited species responsible for the glow can be observed up to a distance of 1.5-2 cm. Above 2 l/min the extent of this luminous plume is virtually independent of the flow rate. In general, this length is indicative of the distance many reactive species can extend into the ambient atmosphere. Measurements with an air ion counter showed high concentrations of negative and positive air ions can be observed beyond the immediate range of the plasma plume, up to a distance of several centimeters from the nozzle. Previous studies found that these long-lived compounds are very effective bactericidal agents.

Studies of plasma jet efficacy have focused on yeast. Yeast infections are known to be notoriously difficult to treat by topical methods. As noted above, the strain *Candida kefer* was cultured on agar (Sabouraud's dextrose agar) in a 100 mm petri dish. A 1 cm area of inoculated agar was exposed to the plasma expelled with an air flow rate of about 8 l/min, at a distance of 1 cm from the discharge. Under these conditions, the afterglow plume has a visible length of 1.3 cm and a temperature of 45° C. at the treatment distance. The microjet is shown in FIG. 12(*a*). The exposure was controlled by stepper motors, which moved the microjet across an area of 1 cm with a speed of 0.5 mm/s in a crisscrossing pattern in increments of 0.5 mm between passes. Accordingly, the total treatment time was 90 s during which the plasma passed over every point twice. As the image in FIG. 12(*b*) demonstrates, the fungus is completely removed in the exposed area, whereas a control exposure, i.e., only flowing the air without starting the discharge, has no effect.

Animal studies have shown that the exposure of healthy skin to the plasma jet, when using the same treatment parameters for the in vitro studies, and even a treatment with a ten times higher "dose" (ten identical exposures of 90 s), did not result in any damage. The results were obtained on hairless SKH-1 mice. Biopsies were taken 1 and 5 days after the treatment to assess damage. The treatment did not inflict any thermal injuries, and histology on the samples did not show any difference between treated and untreated cells.

In summary, the studies show that the use of direct current microhollow cathode discharges to generate an atmospheric pressure air plasma, and turbulent flow used as cooling mechanism, permitted a simple but effective system for fungal decontamination on sensitive surfaces, such as mammalian skin. This "microplasma jet" therefore offers an effective method to treat yeast infections on skin. It is reasonable to assume that similar effect can be obtained on other microbes and possibly even viruses. The major advantage is that healthy cells do not seem to be affected, while pathogens can be eradicated.

Other applications of the presented embodiment and a more flexible adaptation are the chemical decontamination of heat sensitive surfaces such as tissue and the highly spatially resolved cleaning and decontamination from biological and chemical residues in sensitive devices such as circuit boards. Thus, advantages of the presented embodiment of a microplasma jet included the operation or effective functioning within ambient air, and use of direct current power sources.

Other devices intended for similar applications, to the inventors' knowledge, were incapable of operation with air and always operated with noble gases. Air is only mixed in by fractions of a few percent. As a result, the yield in free radicals formed from nitrogen, hydrogen, and oxygen was reduced. So far, the microhollow cathode geometry is the only known method to generate a stable glow discharge at atmospheric pressure in air.

The discharge is further operated with only a direct current at high voltage. Other devices with similar applications, to the knowledge of the inventors, always operated with oscillating voltages of high frequency and/or high voltages to avoid instabilities. The DC power supply instead permits a simple and low cost setup with low power consumption. Since it also enables simple wiring, the device can be easily reduced in size and adopted for other applications.

Nonthermal (i.e., cold) plasmas operated in air at atmospheric pressure offer an appealing method for the processing and decontamination of surfaces. Most existing devices are operated with radiofrequency high voltages. Microhollow cathode discharges (MHCDs), on the other hand, allow us to generate a direct current driven plasma jet in atmospheric pressure gases, including air. The discharge is sustained by a voltage of only several hundred volts applied to two plane metal electrodes which are separated by a dielectric insulator. The plasma is confined in a cylindrical channel drilled through all layers. With a thickness of the dielectric of 0.25 mm and a diameter of the channel of less than 1 mm a stable glow discharge can be sustained. By flowing air or nitrogen through the channel into atmospheric pressure air, a well-defined plasma (i.e., afterglow) jet is generated with a typical, visible length of 10-20 mm. The turbulent gas flow effectively cools the plasma jet down further to temperatures close to room temperature at a distance of 5 mm from the nozzle. This allows using this micro-plasma jet for treatment of heat sensitive materials and surfaces, including in particular the gentle cleaning, decontamination and sterilization of organic materials such as skin.

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A device for the creation of a high pressure plasma jet, comprising:

a first electrode;

a second electrode, spaced from the first electrode;

wherein the first and second electrodes define at least one microhollow through the first electrode and the second electrode that is 0.1-1.2 mm wide;

a circuit for creating an electrical potential between the first electrode and the second electrode, such that the first electrode is a cathode and the second electrode is an anode, at a voltage and direct current for producing microhollow discharges in each of the at least one microhollow formed through the first electrode and the second electrode;

a gas supply for supplying gas into each of the at least one microhollow at the second electrode so as to create a gas plasma exiting the at least one microhollow at the first electrode, wherein the gas is selected from the group consisting of air, noble gasses, molecular gasses, and mixtures thereof;

wherein the first electrode is separated from the second electrode by a dielectric defining at least one microhollow formed through the dielectric, in line with at least one microhollow through the first electrode and the second electrode; and wherein the gas supply for supplying gas into each of the at least one microhollow at the second electrode supplies gas at a flow rate at or between about 50 ml per minute to about 12 liters per minute.

2. The device for the creation of a high pressure plasma jet according to claim 1, wherein the microhollow is tapered such that the area of the microhollow disposed in the second electrode is larger than the area of the microhollow disposed in the first electrode.

3. The device for the creation of a high pressure plasma jet according to claim 1, wherein the first electrode and the second electrode are plane-parallel.

4. The device for the creation of a high pressure plasma jet according to claim 1, wherein at least one microhollow formed through the dielectric is substantially similar in size and shape to the at least one microhollow formed through the first electrode and the second electrode.

5. A method of generating a high pressure, low temperature plasma gas jet, comprising:

applying an electrical potential between a first electrode and a second electrode spaced from the first electrode wherein said first and second electrodes have at least one microhollow formed through the first electrode and the second electrode, such that the first electrode is a cathode and the second electrode is an anode, at a voltage and a direct current so as to produce microhollow discharges in each in each of the at least one microhollow; and directing a gas having a flow rate of about 50 ml per minute to 12 liters per minute through each of the at least one microhollow at the second electrode so as to create a gas plasma jet exiting the at least one microhollow at the first electrode; and wherein the at least one omicrohollow is 0.1-1.2 mm wide.

6. The method of claim 5 wherein the first electrode is separated from the second electrode by a dielectric that defines at least one microhollow formed through the dielectric, in line with the at least one microhollow through the first electrode and the second electrode.

7. The method of claim 5, wherein the first electrode is separated from the second electrode by a dielectric that defines at least one microhollow formed through the dielectric, in line with and substantially similar in size and shape to the at least one microhollow through the first electrode and the second electrode.

8. The method of claim 5, wherein the first electrode and the second electrode are plane-parallel.

9. A method of generating a high pressure plasma jet from a glow plasma discharge comprising:

positioning a first electrode and a second electrode in a plane parallel relationship with a space therebetween;

providing a dielectric between the first electrode and the second electrode;

forming at least one microhollow in line through the first electrode, the second electrode, and the dielectric, the microhollow having a width between 0.1-1.2 mm;

generating an direct current electric field between the first electrode and the second electrode, where the first electrode is a cathode and the second electrode is an anode; and directing a gas having a flow rate of about 50 ml per minute to 12 liters per minute through each of the at least one microhollow at the second electrode so as to create a gas plasma jet exiting the at least one microhollow at the first electrode.

* * * * *